(12) United States Patent
Baehr et al.

(10) Patent No.: US 10,295,428 B2
(45) Date of Patent: May 21, 2019

(54) DEVICE FOR ROTATABLE MOUNTING OF WORK PIECES, IN PARTICULAR CRANKSHAFTS

(71) Applicant: Schenck RoTec GmbH, Darmstadt (DE)

(72) Inventors: Joachim Baehr, Darmstadt (DE); Sebastian Kreuzer, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 280 days.

(21) Appl. No.: 15/302,293

(22) PCT Filed: May 6, 2015

(86) PCT No.: PCT/EP2015/059904
§ 371 (c)(1),
(2) Date: Oct. 6, 2016

(87) PCT Pub. No.: WO2015/169823
PCT Pub. Date: Nov. 12, 2015

(65) Prior Publication Data
US 2017/0030795 A1  Feb. 2, 2017

(30) Foreign Application Priority Data

May 7, 2014  (DE) .................... 10 2014 106 334

(51) Int. Cl.
*G01M 1/04* (2006.01)
*F16C 17/26* (2006.01)
(Continued)

(52) U.S. Cl.
CPC .............. *G01M 1/04* (2013.01); *F16C 17/26* (2013.01); *F16C 13/04* (2013.01); *F16C 17/02* (2013.01); *F16C 23/02* (2013.01); *F16C 2370/00* (2013.01)

(58) Field of Classification Search
CPC ............ G01M 1/04; G01M 1/06; G01M 1/02; G01M 1/16; G01M 1/22
See application file for complete search history.

(56) References Cited

U.S. PATENT DOCUMENTS 2,857,764 A * 10/1958 Frank ...................... G01M 1/22
384/6
3,090,237 A    5/1963 Ongaro
(Continued)

FOREIGN PATENT DOCUMENTS

DE     355 241 C     6/1922
DE  103 16 767 A1  10/2004
(Continued)

OTHER PUBLICATIONS

International Search Report of PCT/EP2015/059904, dated Jul. 31, 2015.

*Primary Examiner* — Helen C Kwok
(74) *Attorney, Agent, or Firm* — Collard & Roe, P.C.

(57) ABSTRACT

The invention relates to a device for receiving workpieces to be balanced in a machine for performing an unbalance compensation having a bearing device (2) arranged on a machine frame for rotatable mounting of the workpiece (3) around a bearing axis (L), wherein the bearing device (2) has at least one bearing block (10) having two bearing shells (18, 19) differing in diameter and lying adjacent to each other in a direction transverse to the bearing axis (L). The bearing block (10) is movable transversely to the bearing axis (L) of the bearing device (2) into two bearing positions and another one of the two bearing shells (18, 19) is aligned centrally to the bearing axis (L) in each of the two bearing positions.

6 Claims, 3 Drawing Sheets

(51) Int. Cl.
*F16C 13/04* (2006.01)
*F16C 17/02* (2006.01)
*F16C 23/02* (2006.01)

(56) References Cited

U.S. PATENT DOCUMENTS

| | | | |
|---|---|---|---|
| 3,452,604 A | | 7/1969 | Schaub |
| 3,677,093 A | * | 7/1972 | Hutchings, Sr. ........ G01M 1/04 73/473 |
| 4,981,043 A | * | 1/1991 | Okumura ................ G01M 1/04 73/462 |
| 6,675,707 B1 | | 1/2004 | Heiler et al. |
| 7,412,884 B2 | | 8/2008 | Feldmann et al. |

FOREIGN PATENT DOCUMENTS

| | | |
|---|---|---|
| EP | 0 579 969 A1 | 1/1994 |
| EP | 0 803 720 A2 | 10/1997 |
| EP | 0 997 276 A1 | 5/2000 |
| GB | 714 351 A | 8/1954 |

\* cited by examiner

DEVICE FOR ROTATABLE MOUNTING OF WORK PIECES, IN PARTICULAR CRANKSHAFTS

CROSS REFERENCE TO RELATED APPLICATIONS

This application is the National Stage of PCT/EP2015/059904 filed on May 6, 2015, which claims priority under 35 U.S.C. § 119 of German Application No. 10 2014 106 334.1 file on May 7, 2014, the disclosure of which is incorporated by reference. The international application under PCT article 21(2) was not published in English.

BACKGROUND OF THE INVENTION

1. Field of the Invention

This invention relates to a device for receiving workpieces to be balanced, in particular crankshafts, in a machine for performing an unbalance correction, using a bearing device arranged on a machine frame for supporting the workpiece for rotation about a bearing axis.

2. Description of the Related Art

Balancing machines serve the function of measuring and compensating for the unbalance of rotors and are conventionally used for a variety of rotors differing in terms of diameter and also the axial position of their bearings. Crankshafts are a typical example, which are intended for use with a variety of engines and may differ in main bearing diameter, bearing spacing and length. For precise correction of an existing unbalance, it is necessary for the rotor to be received with its bearing surfaces in a position centered relative to the bearing axis of the balancing machine. This is accomplished by bearing elements of a bearing device, which requires the bearing elements to be adjusted to the respective diameters of the rotor bearings for precise central location of the rotor. In cases where it is desired to balance rotors of different bearing diameters in alternation, this invariably requires a changeover of the bearing device to adjust the bearing elements to the bearing diameter to be received. In an effort to automate the unbalance correction of rotors, for example, of crankshafts, it is also desirable to provide for an automatic changeover of the rotor mount to accommodate the rotor type to be received.

EP 0 803 720 A2 discloses an unbalance measuring station to determine the unbalance of rotors having a plurality of bearing points, in particular crankshafts, which includes bearing devices supported on an oscillating beam for rotatably mounting the rotor. In order to be able to determine the unbalance of a variety of rotors without the need for complex changeover actions, the oscillating beam is provided with more than two bearing devices for rotatably mounting the rotor, and provision is made for a device which enables the radial distance between bearing points on the rotor and associated bearing devices of the unbalance measuring station to be varied such that two selected bearing points of the rotor are rotatably supported only on their assigned bearing devices. In the known measuring station, all bearing devices lie next to each other in axial direction so that different shaft diameters can be seated only on different axial positions. The known unbalance measuring station is however not suitable for different bearing diameters in the same bearing plane.

U.S. Pat. No. 3,090,237 discloses a device for balancing rotors in which two support stands are adapted to be secured to any position on a machine extending longitudinally in the axial direction. The support stands include supporting rolls arranged on adjustable scissors-type levers to enable them to be adjusted in height and horizontal distance to different bearing diameters of a rotor to be balanced. In this arrangement, the adjusting movement of the rolls is constructed such that in all adjustments the position of the axis of rotation of the support remains unchanged in relation to the support stand.

An unbalance measuring device known from DE 103 16 767 A1 includes, for receiving rotor circumferential sections, a bearing device having open fluid supplied bearing shells and fluid-supplied support plates associated with the rotor end surfaces. To accommodate different types of rotor, the bearing shells and the support plates are replacably secured to carriers arranged on a support beam.

To support the shaft ends of rotogravure cylinders in a processing machine, it is known from EP 0 579 969 A1 to arrange in a bearing block two rotary bodies each composed of three bearing shells differing in their nominal diameter. Rotation of the two rotary bodies enables one of the bearing shells to be moved into operating position. In this manner it is possible to support shaft ends of three different diameters in the bearing block.

SUMMARY OF THE INVENTION

It is an object of the present invention to provide a device of the type initially referred to which enables the bearing device to be adjusted automatically to accommodate two or more bearing diameters lying in the same bearing plane. Desirably, the device should also afford ease and economy of manufacture and ensure precise centering of the bearing device relative to the bearing axis on each adjustment.

This object is accomplished by a device embodying the features according to the invention. Advantageous embodiments of the device are discussed below.

In the device of the invention, the bearing device includes at least one bearing block having at least two bearing elements differing in diameter and lying next to each other in a direction transverse to the bearing axis, wherein the bearing block is movable transversely to the bearing axis of the bearing device into two bearing positions, and wherein in each of the two bearing positions another one of the two bearing elements is aligned centrally to the bearing axis.

In the device of the invention, the changeover to a different bearing diameter is accomplished by moving the bearing block in the bearing plane from one bearing position into a second one, with the bearing elements of different diameter being precisely centered in both bearing positions.

Movement of the bearing block may be accomplished in easy manner automatically by means of a drive mechanism, with the bearing positions being precisely definable by stop means limiting the movements of the bearing block. The stop means may be of the adjustable type.

The device of the present invention has the advantage of enabling any desired bearing elements to be used. In particular, the bearing elements may be comprised of bearing shells ensuring a stable and accurately repeatable support of the workpiece to be balanced. The bearing elements may be replaceably mounted on the bearing block. In this way it is possible to provide the bearing device with a different bearing diameter by replacing the bearing elements.

According to another proposal of the invention, the at least one bearing block may be adjustable relative to the machine frame in the direction of the bearing axis. In this way it is possible for the device to accommodate different positions and relative spacings of the workpiece bearings. Also the axial adjustability may be achieved automatically by means of a servo motor and by monitoring and controlling the axial actuating travel.

In a straightforward and advantageous embodiment of the device of the invention, the at least one bearing block is arranged on a slide movable along a straight-line guide provided on a slide carrier. The slide carrier mounts a drive mechanism enabling the slide to be moved into its bearing positions. The drive mechanism may be of any desired configuration. In one advantageous configuration, the drive mechanism includes a pneumatic working cylinder and a lever transmission to transmit the movement of the working cylinder to the slide.

Furthermore, the slide carrier may be carried for movement in a straight-line guide arranged on the machine frame parallel to the bearing axis. This enables the bearing block to be adjusted relative to the machine frame in the direction of the bearing axis in easy manner. To perform the adjustment automatically, provision may be made for an actuator for moving the slide carrier relative to the machine frame.

BRIEF DESCRIPTION OF THE DRAWINGS

The present invention will be explained in more detail in the following with reference to an embodiment illustrated in the accompanying drawing. In the drawing.

DETAILED DESCRIPTION OF THE PREFERRED EMBODIMENTS

Figure 1:
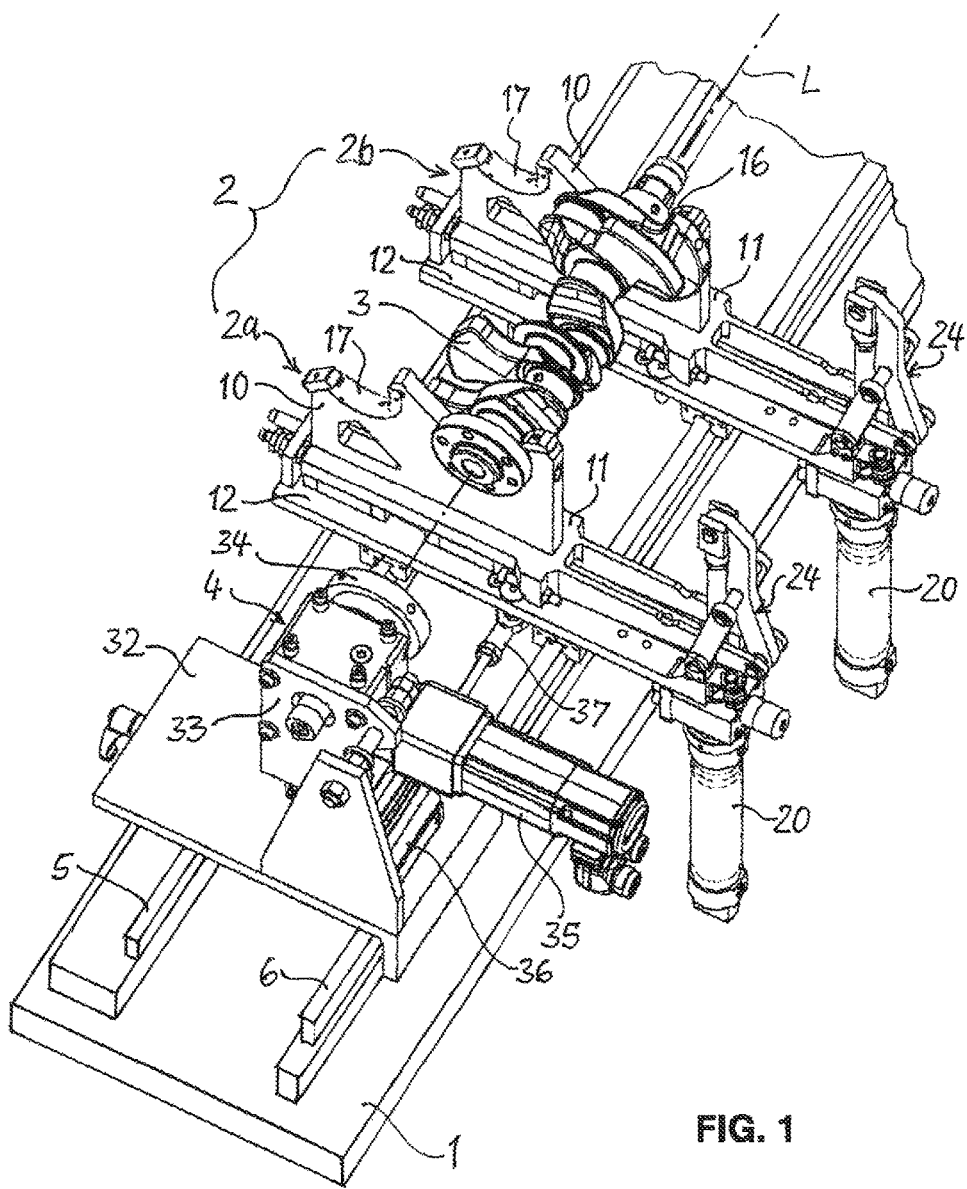
FIG. 1 is a perspective view of a device for receiving and positioning a crankshaft in a machine for performing an unbalance correction.
Figure 2:
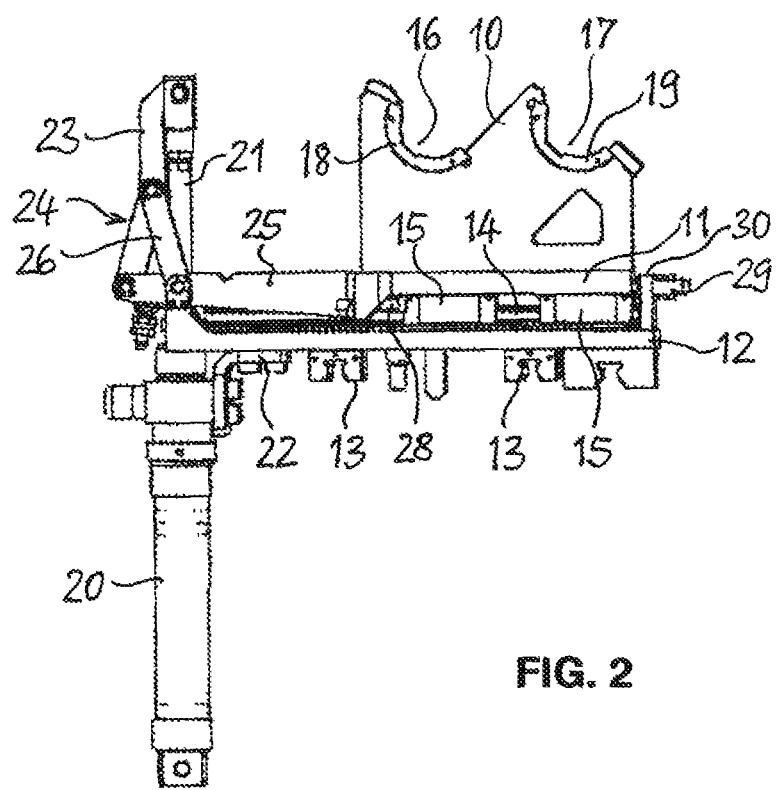
FIG. 2 is a side view of a unit comprised of bearing block, slide and slide carrier of the device of FIG. 1.
Figure 3:
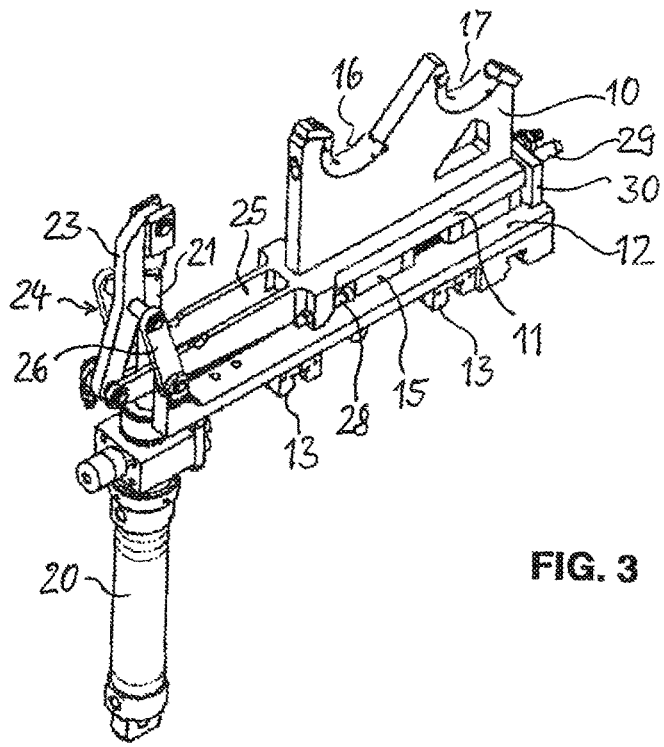
FIG. 3 is a perspective view of the unit of FIG. 2.

FIG. 1 shows, as seen looking from above, a plate-shaped upper part 1 of a machine frame mounting a bearing device 2 for supporting a workpiece 3, in this Figure a crankshaft, and a rotary positioning mechanism 4. The upper part 1 includes parallel guide rails 5, 6 forming a straight-line guide on which the bearing device 2 and the rotary positioning mechanism 4 are held and carried for movement in the guide direction.

The bearing device 2 comprises two identical units 2a, 2b in side-by-side arrangement. The units 2a, 2b are movable longitudinally to the guide rails 5, 6 independently of each other. Each unit 2a, 2b includes a plate-shaped bearing block 10, a slide 11 carrying the bearing block 10, and a slide carrier 12 on which the slide 11 is mounted for movement in a straight line. On its underside, the slide carrier 12 is provided with guide elements 13 holding and guiding it on the guide rails 5, 6. On its upper side, the slide carrier 12 includes a guide rail 14 aligned parallel to a plane perpendicular to the guide rails 5, 6. The slide 11 is movably carried on the guide rail 14 by means of guide elements 15.

The plate-shaped bearing block 10 is aligned parallel to a plane perpendicular to the guide rails 5, 6 and has on its upper side two relatively spaced bearings 16, 17 of different size with bearing shells 18, 19.

To move the slide 11 longitudinally to the guide rail 14, the slide carrier 12 mounts a pneumatic working cylinder 20 having its longitudinal axis aligned normal to the plane of movement of the slide carrier 12. The working cylinder 20 has the exit end for its piston rod 21 secured to the underside of the slide carrier 12 by means of an angle bracket 22, such that the piston rod 21, in the extended position shown in the drawing, protrudes upwardly beyond the slide carrier 12.

The end of the piston rod 21 is connected with the end of a two-armed lever 23 of a lever transmission 24 transmitting the movement of the piston rod 21 to the slide 11. For this purpose, the slide 11 includes a fork 25 having its free ends pivotally jointed to the other end of the lever 23. In its middle, the lever 23 is rotatably mounted on the ends of lever supports 26 whose opposite ends are rotatably secured to the slide carrier 12.

The Figures show the slide 11 in its end position with the piston rod 21 extended in which the bearing 16 of the bearing block 10 is in the bearing position for unbalance correction. To move the bearing block 10 into the other bearing position in which the bearing 17 occupies the position of the bearing 16, the piston rod 21 is retracted into the working cylinder 20. As this occurs, the lever 23 and the lever supports 26 are rotated in opposite directions, and the lever 23 moving away from the piston rod 21 pulls the slide 11 close to the piston rod 21. The end position of the slide 11 is defined by a stop screw 28 provided on the slide 11, which makes abutment with the bearing element protruding from the slide carrier 12 for rotatably carrying the lever support 26.

The opposite end position is limited by an adjustable stop screw 29 arranged in an upright end plate 30 of the slide carrier 12.

The rotary positioning mechanism 4 arranged on the upper part 1 is mounted on a slide 32 equally movably carried on the guide rails 5, 6. Arranged on the slide 32 is a spindle housing 33 receiving a rotary positioning spindle 34 capable of being rotated into any presettable angular position by a servo motor 35. The slide 32 mounts in addition a linear drive mechanism 36 which is connected to the slide carrier 12 of the unit 2a by a drive rod 37 and serves to advance the rotary positioning mechanism 4 to the workpiece 3 carried in the bearing device 2 to enable the rotary positioning spindle 34 to be coupled to the workpiece 3.

FIG. 1 shows the bearing device 2 in a position in which the bearing blocks 10 of the units 2a, 2b are at the proper relative distance for receiving the workpiece 3 which in this instance is a crankshaft for a three-cylinder engine, and in which their bearings 16, in the bearing position, are provided with bearing shells the diameters of which correspond to the diameters of the workpiece bearings.

In this position, the bearings 16 of the bearing blocks 10 define with their center points a bearing axis L which coincides with the axis of rotation of the seated workpiece 3. The rotary positioning mechanism 4 is arranged on the upper part 1 such that the axis of rotation of the rotary positioning spindle 34 coincides with the bearing axis L. In this way, it is possible for the rotary positioning spindle 34 to be coupled directly to the flange of the workpiece 3. For unbalance correction, the rotary positioning spindle 34 rotates the workpiece 3 into the prior established correction position. Using a drilling device, not shown, which is arranged above the correction position the unbalance correction can then be performed by the removal of stock from the workpiece 3.

When it is desired to receive in the device a workpiece whose bearings differ in diameter from the workpiece 3, the bearings 17 of the bearing blocks 10 are provided with bearing shells 19 of a bearing diameter suitable for this other workpiece and with center points lying in a plane containing the bearing axis L and arranged parallel to the linear movement of the slide 11. For seating the other workpiece following removal of the workpiece 3, the working cylinders 20 are controlled such that the piston rods 21 are moved into a retracted position, which causes the bearing blocks 10 to be moved into the other position closer to the piston rods 21. In this position of the bearing blocks 10, the bearing axis L now defined by the bearing shells 19 is at the same place as previously the bearing axis L of the bearing shells 18. As described in the foregoing, the workplace held in the bearing shells 19 may then be coupled to the rotary positioning spindle, rotated into the proper position and balanced.

To seat relatively long or short workpieces or workpieces with different spacing between bearings, the units 2a, 2b of the bearing device 2 may be displaced relative to each other longitudinally to the guide rails 5, 6. Such displacement may be accomplished fully automatically by means of actuators, not shown, using predetermined or prior collected position data.

Figure 4:
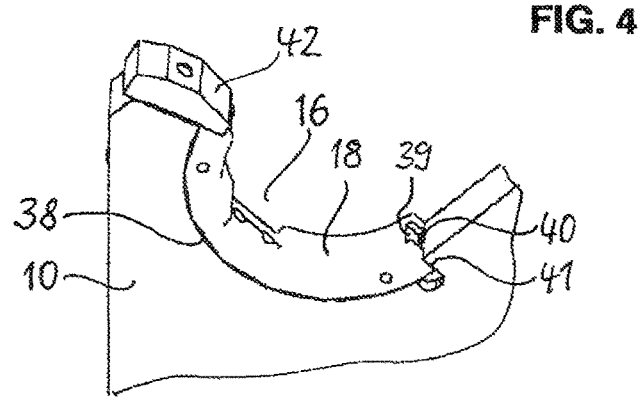
FIG. 4 is a view of a section of the bearing block of FIG. 3 showing a bearing element arranged therein.

FIG. 4 shows the fastening of a bearing shell 18 in the bearing 16 of a bearing block 10. The bearing shell 18 rests with a cylinder surface concentric with the bearing center in a concentric cylindrical recess 38 of the bearing block 10. Grooves 39 provided at the ends of the bearing shell 18 are engaged by projections 40 formed on a shoulder 41 of the bearing block 10 and on a detachable holding element 42. The projections 40 fixedly hold the bearing shell 18 in axial direction. To replace the bearing shell 18, the holding element 42 held by a screw is removed. The fastening of the bearing shell 19 is constructed in like manner.

The invention claimed is:

1. A device for receiving workpieces to be balanced in a machine for performing an unbalance correction, with a bearing device arranged on a machine frame for supporting the workpiece for rotation about a bearing axis L,
   wherein the bearing device includes at least one bearing block having two bearing elements differing in diameter and lying next to each other in a direction transverse to the bearing axis,
   wherein the bearing block is movable transversely to the bearing axis of the bearing device into first and second bearing positions,
   wherein in each of the first and second bearing positions another one of the two bearing elements is aligned centrally to the bearing axis,
   wherein the at least one bearing block is adjustable relative to the machine frame in the direction of the bearing axis,
   wherein the at least one bearing block is arranged on a slide movable along a straight-line guide provided on a slide carrier, and
   wherein the slide carrier mounts a drive mechanism enabling the slide to be moved into the bearing positions.

2. The device according to claim 1, further comprising a first stop limiting movement of the at least one bearing block relative to the machine frame in a first direction of movement and a second stop limiting movement of the at least one bearing block relative to the machine frame in a second direction of movement, wherein the bearing position of the at least one bearing block is adjustable by the first stop and the second bearing position of the at least one bearing block is adjustable by the second stop.

3. The device according to claim 1, wherein the bearing elements of the at least one bearing block are replaceable bearing shells.

4. The device according to claim 1, wherein the drive mechanism includes a pneumatic working cylinder and a lever transmission to transmit the movement of the working cylinder to the slide.

5. The device according to claim 1, wherein the slide carrier is carried for movement in a straight-line guide arranged on the machine frame parallel to the bearing axis.

6. The device according to claim 1, wherein the machine frame mounts an actuator for moving the slide carrier in the direction of the bearing axis.

* * * * *

UNITED STATES PATENT AND TRADEMARK OFFICE
CERTIFICATE OF CORRECTION

PATENT NO. : 10,295,428 B2  
APPLICATION NO. : 15/302293  
DATED : May 21, 2019  
INVENTOR(S) : Baehr et al.

Page 1 of 1

It is certified that error appears in the above-identified patent and that said Letters Patent is hereby corrected as shown below:

In the Claims

In particular, in Column 5, Line 35 (Line 4 of Claim 1) after "axis" please delete: "L".

In Column 6, Line 22 (Line 6 of Claim 2) before "bearing" please add: --first--.

Signed and Sealed this  
Ninth Day of July, 2019

Andrei Iancu  
*Director of the United States Patent and Trademark Office*